United States Patent
Govindhasamy

(10) Patent No.: US 9,510,199 B2
(45) Date of Patent: Nov. 29, 2016

(54) SOFT ACTIVATION OF CELLULAR MODEMS IN TABLETS

(71) Applicant: Nokia Corporation, Espoo (FI)

(72) Inventor: Karthik Govindhasamy, San Diego, CA (US)

(73) Assignee: Nokia Technologies Oy, Espoo (FI)

( * ) Notice: Subject to any disclaimer, the term of this patent is extended or adjusted under 35 U.S.C. 154(b) by 96 days.

(21) Appl. No.: 13/856,202

(22) Filed: Apr. 3, 2013

(65) Prior Publication Data

US 2014/0302817 A1   Oct. 9, 2014

(51) Int. Cl.
| | |
|---|---|
| H04W 12/08 | (2009.01) |
| H04W 8/24 | (2009.01) |
| H04W 76/02 | (2009.01) |
| H04W 88/06 | (2009.01) |
| H04M 15/00 | (2006.01) |
| G06F 21/12 | (2013.01) |

(52) U.S. Cl.
CPC ............. *H04W 12/08* (2013.01); *H04W 8/245* (2013.01); *G06F 21/121* (2013.01); *H04M 15/00* (2013.01); *H04W 76/02* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 7,680,741 | B2* | 3/2010 | Cook et al. ................... | 705/52 |
| 8,208,517 | B2 | 6/2012 | Souissi et al. | |
| 2004/0157630 | A1 | 8/2004 | Monroe et al. | |
| 2005/0138356 | A1 | 6/2005 | Hurwitz | |
| 2008/0297306 | A1 | 12/2008 | Huajun et al. | |
| 2010/0188975 | A1 | 7/2010 | Raleigh | |
| 2010/0325051 | A1 | 12/2010 | Etchegoyen | |
| 2011/0004549 | A1 | 1/2011 | Gray et al. | |
| 2011/0116459 | A1 | 5/2011 | Lee et al. | |
| 2011/0130118 | A1 | 6/2011 | Fan et al. | |
| 2012/0084553 | A1 | 4/2012 | Jung et al. | |
| 2012/0171996 | A1* | 7/2012 | Mocanu et al. ............... | 455/411 |
| 2014/0194103 | A1* | 7/2014 | O'Donnell et al. ........... | 455/418 |

FOREIGN PATENT DOCUMENTS

EP   2533462 A1   12/2012

OTHER PUBLICATIONS

"Unlock Your 3G USB Dongle With Software", downloaded from the Internet: <http://keep2enjoy.blogspot.in/2011/09/unlock-3g-usm-dongle-modem-software.html>, publication date Sep. 2, 2011.
International Search Report dated Mar. 28, 2014 for PCT application No. PCT/FI2014/050092.
"Bluetooth for iPod Touch? Hidden hardware unleashed through software updates?", downloaded from the Internet: <http://formus.macrumors.com/archive/index.php/t-669745.html>, Aug. 12, 2013.

* cited by examiner

*Primary Examiner* — Charles Appiah
*Assistant Examiner* — Margaret G Mastrodonato
(74) *Attorney, Agent, or Firm* — Mintz Levin Cohn Ferris Glovsky and Popeo, P.C.

(57) ABSTRACT

Methods and apparatus, including computer program products, are provided for soft activation. In some example embodiments, there is provided a method. The method may include providing an indication representative of a request to unlock a locked cellular modem at a user equipment, wherein the user equipment comprises the locked cellular modem and a wireless local area network modem unlocked to allow operation via a wireless local area network; and receiving, at the user equipment, activation information to enable activating the locked cellular modem. Related apparatus, systems, methods, and articles are also described.

13 Claims, 3 Drawing Sheets

SOFT ACTIVATION OF CELLULAR MODEMS IN TABLETS

FIELD

The subject matter disclosed herein relates to wireless communications, and, in particular, activation of devices, such as for example, tablet computers.

BACKGROUND

A tablet computer, hereinafter tablet, refers to a computer typically configured within a substantially flat structure, such as for example, a panel. The tablet typically includes a touch screen display serving as a primary mechanism for user input and user output. The tablet computer may also include one or more radio interfaces, such as for example, a cellular modem, a WiFi modem, and/or the like, to provide the tablet with access to a network including a cellular network, the Internet, and/or the like.

SUMMARY

Methods and apparatus, including computer program products, are provided for soft activation. In some example embodiments, there is provided a method. The method may include providing an indication representative of a request to unlock a locked cellular modem at a user equipment, wherein the user equipment comprises the locked cellular modem and a wireless local area network modem unlocked to allow operation via a wireless local area network; and receiving, at the user equipment, activation information to enable activating the locked cellular modem.

In some variations, one or more of the featured disclosed herein including one or more of the following features can optionally be included in any feasible combination. The user equipment may include a tablet. The wireless local area network modem may include a WiFi modem. The locked cellular modem may include a cellular modem configured to disable at least one of a registration to a cellular network, an authentication to a cellular network, or an access to a cellular network. The indication may further represent a payment corresponding to a portion of a purchase price of the locked cellular modem. The purchase price of the locked cellular modem may be deferred from an initial purchase of the user equipment to when the locked cellular modem is activated. The deferred purchase price may represent a payment, at the activation of the locked cellular modem, to at least one of a mobile wireless carrier, a service provider, a cellular modem manufacturer, a tablet maker, or a payment processor. The deferred purchase price of the locked cellular modem may enable an initial purchase price of the user equipment to be substantially the same to another user equipment having only a WiFi modem. The locked cellular modem may be activated by at least using the activation information to initiate the unlocking of the locked cellular modem. The receiving may further include receiving the activation information in response to the provided indication, wherein the indication is wirelessly provided by the user equipment to an activation server, and wherein the activation information is wirelessly received by the user equipment from the activation server.

Articles are also described that comprise a tangibly embodied computer-readable medium embodying instructions that, when performed, cause one or more machines (for example, computers) to result in operations described herein. Similarly, apparatus are also described that can include a processor and a memory coupled to the processor. The memory can include one or more programs that cause the processor to perform one or more of the operations described herein.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

Figure 1:
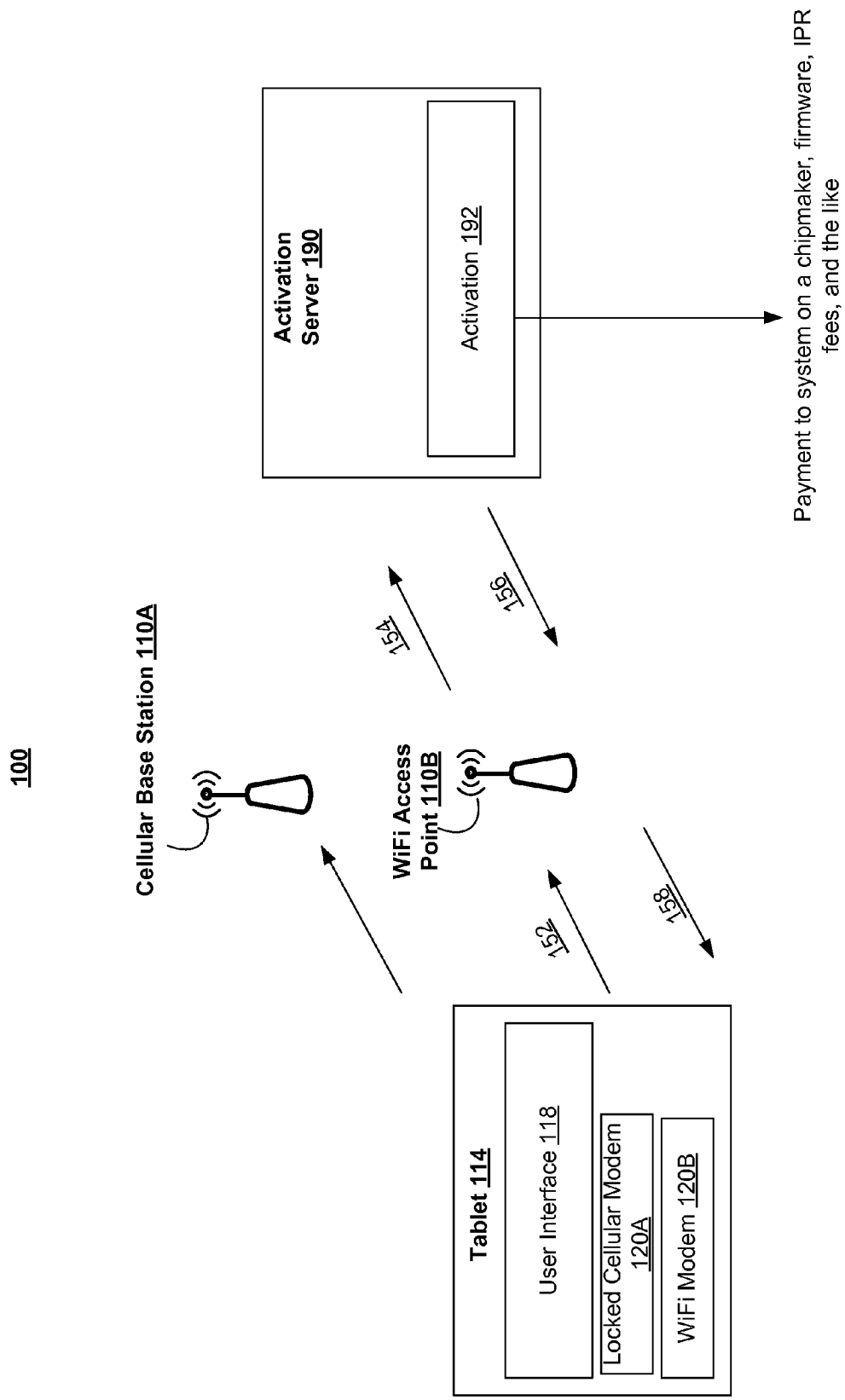
FIG. 1 depicts an example of a system where a cellular modem of a tablet is activated, in accordance with some example embodiments.

Like labels are used to refer to same or similar items in the drawings.

DETAILED DESCRIPTION

When a user purchases a tablet, the price difference can be substantial between a tablet configured with only a WiFi modem and a tablet including both a WiFi modem and a cellular modem. For example, a user deciding between a typical tablet having WiFi and a tablet having both WiFi and cellular may select the WiFi only tablet in order to avoid paying the 20%-25% price premium for the tablet configured with both WiFi and cellular.

The subject matter disclosed herein may, in some example embodiments, relate to configuring a tablet with both a WiFi modem and a cellular modem, but the cellular modem is locked to prevent use until activation by a user. Moreover, some, if not all of, the price of the cellular modem may not be included in the initial sales price of the tablet, so that payment of the cellular modem is effectively deferred until activation of the locked cellular modem. Activation by the user may, in some example embodiments, include sending an indication, such as for example, a message to an activation server. In some example embodiments, this indication may represent that the user activates the cellular modem by making, for example, a payment to the activation server. In response, the user may, in some example embodiments, receive activation information from the activation server to enable activation of the locked cellular modem. Moreover, the provider of the cellular modem may, in some example embodiments, receive a portion of the activation payment to reimburse some, if not all of, the price of the cellular modem (which as noted above may not have been included in the initial price of the tablet).

FIG. 1 depicts a system 100, in accordance with some example embodiments.

A tablet computer 114 (hereinafter tablet) may include one or more data processors, a computer-readable storage medium including computer program code, one or more radio interfaces, a user interface 118, such as for example, a touch sensitive display, and/or the like. Tablet 114 may, in some example embodiments, be characterized as having a display that is touch sensitive to allow a user to provide input/output via the touch sensitive display. Although some of the examples described herein refer to a tablet computer, other devices having a plurality of radio interface technology types may be used as well.

In some example embodiments, the radio interfaces of tablet 114 may further include a locked cellular modem 120A and a WiFi modem 120B. As noted above, a user may purchase tablet 114 with both the locked cellular modem 120A and the WiFi modem 120B. Although the purchase price of the tablet 114 may include the price of the WiFi modem, some, if not all of, the price of the locked cellular modem 120A may be deferred, in some example embodiments, until a user unlocks by, for example activating the locked cellular modem 120A as disclosed herein.

In some example embodiments, tablet 114 may include, or have access to, an application to facilitate the activation. For example, the application may, in some example embodiments, be implemented as a dedicated application, a browser, and/or any other type of application. To illustrate by way of an example, a user may access the application and indicate a desire to activate the locked cellular modem 120A (for example, by accessing a web page and providing a request to activate the locked modem, sending a message indicating a request to activate, and/or the like). When this is the case, tablet 114 may provide and/or send an indication at 152 and 154 to, for example, WiFi access point 110B and server 190. This indication may represent the user's desire to activate the locked cellular modem 120A. For example, the indication may represent payment information, such as for example, credit card information, a debit to an account, and/or any other form of payment, such as for example, an activation request message sent to a mobile wireless carrier, a service provider, and/or a third party (for example, a cellular modem manufacturer, a tablet maker, and/or the like).

The activation server 190 may include one or more data processors and a computer-readable storage medium including computer program code. The activation server 190 may, in some example embodiments, be part of a wireless carrier's network and/or may be a server coupled to the Internet and thus accessible by tablet 114.

The activation server 190 may further include activation circuitry 192 configured to send activation information to tablet 114 to enable a user to unlock the locked cellular modem 120A. The server 190 may send the activation information in a variety of ways. For example, server 190 may send an email or provide a page (for example, a hypertext markup language page and/or the like) to tablet 114 via WiFi access point 110B, as depicted at 156-158. The activation server 190 may also send the activation information via a short message service message to a device designated by the user of tablet 114. For example, the user may provide a phone number at which the server can provide the activation information, and/or an email address at which the server can provide the activation information.

When the activation information is received at tablet 114, the locked cellular modem 120A may be activated and thus unlocked. As used herein, a locked cellular modem represents a cellular modem that is not accessible by, not registered with, and/or not allowed to access a cellular network, so unlocking the cellular modem allows access, registration, and/or the like to a wireless carrier's cellular network. In some example embodiments, the activation information may comprise a code and/or any other information, which when entered at tablet 114 unlocks cellular modem 120A. In some example embodiments, the activation information sent by activation server 190 may be received via one or more links, such as for example, WiFi link 158, and programmatically extracted and/or used to unlock the locked modem 120A, with little or no intervention on the part of the user. The activation information may be received in other ways as well. For example, a user may provide a serial number and/or payment information, such as an indication of an actual payment or an intent to make an payment, into the activation server 190, and, in response, the activation server 190 provides an activation information, which can be entered at the user equipment to unlock the locked cellular modem. The activation information may be provided in a variety of ways including via wireless network, a wired network, and/or in any other communication mechanism.

Although some of the examples described herein refer to unlocking a locked cellular modem, the locked component may comprise other types of devices. For example, the locked component may comprise a locked storage device, a locked camera, a locked wireless local area network modem, a locked geolocation processor, and/or any other component within the tablet 114. For example, tablet 114 may include different memory configurations, such as 32 gigabytes, 64 gigabytes, and/or 128 gigabytes, and one or more of these may be activated by the activation server as disclosed herein.

In some example embodiments, once the cellular modem 120A is unlocked, tablet 114 may then access, register, and/or communicate with the carrier's cellular network including cellular base station 110A.

When cellular modem 120A is unlocked, activation server 190 including activation module 192 may, in some example embodiments, send one or more messages to third-party processors. These messages may represent a portion of the payment price for the originally locked cellular modem 120A. For example, tablet 114 may be purchased by a user but the purchase price may not reflect some, if not all of, the true price of the tablet 114 because the third party may defer obtaining remuneration for the locked cellular modem 120A until a user decides to activate the locked cellular modem 120A. The third party may represent one or more of a maker of the cellular modem, a chipmaker associated with the cellular modem, a maker of the tablet, a firmware provider for the cellular modem, a software provider for the cellular modem, a holder of rights (for example, patent rights and/or the like) for the cellular modem, and/or any other entity.

Before providing additional details regarding system 100, the following provides additional description of an example framework for system 100.

In some example embodiments, system 100 may further include one or more wireless access points, such as for example, cellular base station 110A and a WiFi access point 110B. In the example of FIG. 1, tablet 114 is served by cellular base station 110A and WiFi access point 110B. The cellular base station 110A and/or WiFi access point 110B may have wired and/or wireless backhaul links to other networks and/or network nodes, such as for example, a mobility management entity, other base stations, a radio network controller, a core network, a serving gateway, and/or activation server 190.

In some example embodiments, base station 110A may serve a cell, such as for example, a macrocell, and WiFi access point 110B may serve a small cell such as for example, a WiFi wireless local area network, a picocell, a femtocell, a home base station cell, an Long Term Evolution (LTE) enhanced local area (eLA) cell, and/or the like, although other types of base stations, access points, and/or cells may be implemented as well.

In some example embodiments, tablet 114 may be implemented as a mobile device and/or a stationary device. In some example embodiments, tablet 114 may be implemented as a multi-mode user device configured to operate using a plurality of radio access technologies. For example, tablet 114 may be configured to operate using a plurality of radio access technologies including one or more of the following: Long Term Evolution (LTE), wireless local area network (WLAN) technology, such as for example, 802.11 WiFi and/or the like, Bluetooth, Bluetooth low energy (BT-LE), near field communications (NFC), and/or any other radio access technologies. Moreover, the tablet 114 may be configured to have established connections to access points using a plurality of the radio access technologies. In some example embodiments, the cellular modem 120A and the WiFi modem 120B are each configured as a system on a chip (SoC), although other implementations may be used as well. And, the cellular modem 120A may be configured to operate in accordance with LTE and/or the like but initially locked until activation as disclosed herein.

The wireless access points, such as for example, cellular base station 110A, may, in some example embodiments, be implemented as an evolved Node B (eNB) type base station, although other types of radio access technologies may be implemented as well. When the evolved Node B (eNB) type base station is used, base station 110A may be configured in accordance with standards, including the Long Term Evolution (LTE) standards, such as for example, 3GPP TS 36.201, Evolved Universal Terrestrial Radio Access (E-UTRA), Long Term Evolution (LTE) physical layer, General description, 3GPP TS 36.211, Evolved Universal Terrestrial Radio Access (E-UTRA), Physical channels and modulation, 3GPP TS 36.212, Evolved Universal Terrestrial Radio Access (E-UTRA), Multiplexing and channel coding, 3GPP TS 36.213, Evolved Universal Terrestrial Radio Access (E-UTRA), Physical layer procedures, 3GPP TS 36.214, Evolved Universal Terrestrial Radio Access (E-UTRA), Physical layer—Measurements Protocol specification, 3GPP TS 36.331, Technical Specification Group Radio Access Network, Evolved Universal Terrestrial Radio Access (E-UTRA), Radio Resource Control (RRC), and any subsequent additions or revisions to these and other 3GPP series of standards (collectively referred to as LTE standards). Cellular base station 110A may also be configured to serve cells using a WLAN technology, such as for example, WiFi (for example, the IEEE 802.11 series of standards), as well as any other radio access technology capable of serving a cell. Similarly, although access point 110B is described in some examples as a WiFi access point, access point 110B may include other access technologies including cellular-based technologies.

Although FIG. 1 depicts a specific quantity and configuration of base stations/access points, a tablet, and a server, other quantities and configurations may be implemented as well.

Figure 2:
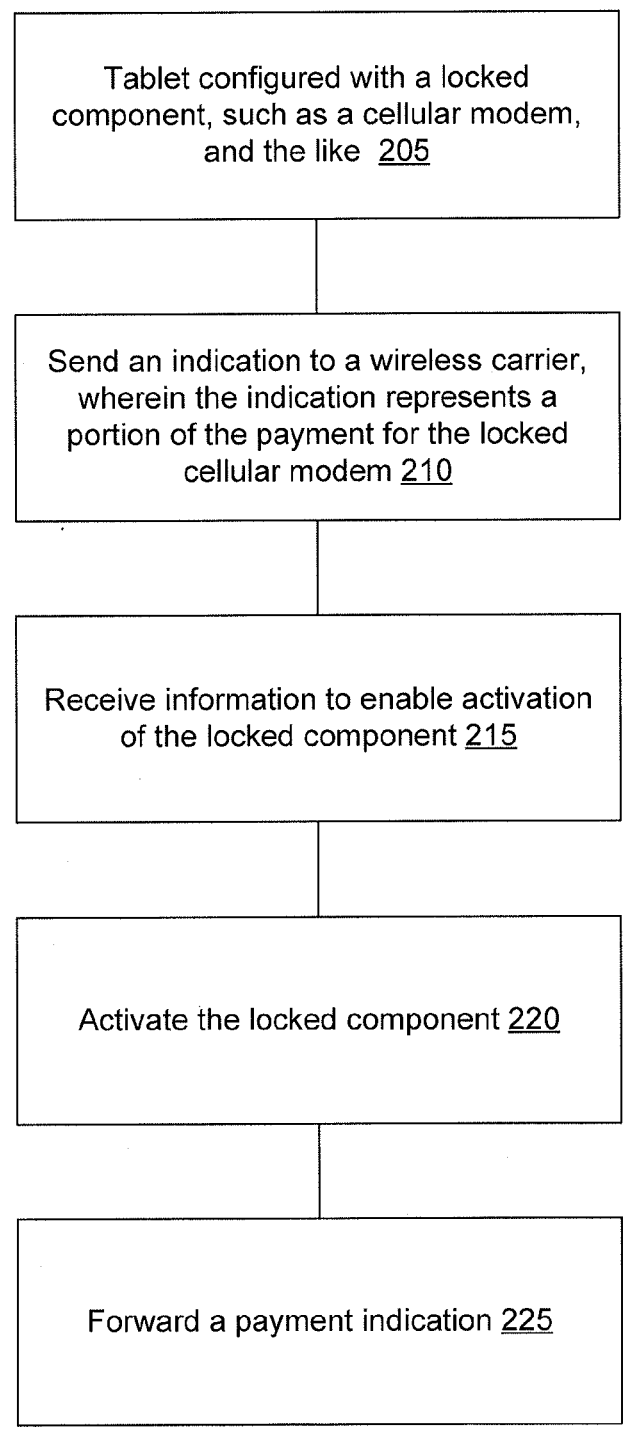
FIG. 2 depicts an example of a process for activating a locked cellular modem, in accordance with some example embodiments.

FIG. 2 depicts an example of a process 200 for soft activation of a locked cellular modem, in accordance with some example embodiments. The description of FIG. 2 also refers to FIG. 1.

At 205, a tablet 114 may be purchased with radio interfaces including a WiFi modem 120B and a cellular modem 120A, but the cellular modem may be locked, in accordance with some example embodiments. Moreover, because the cellular modem is locked, the user's payment for the tablet may not fully reflect the price of the cellular modem, and a portion of this price may be deferred until after the user activates the locked cellular modem by, for example, making a payment representative of the price of the locked cellular modem or taking any other type of action representing a desire to activate the locked cellular modem.

At 210, the tablet 114 may provide an indication to activation server 190, in accordance with some example embodiments. In some example embodiments, the activation server 190 may be a node of a carrier's cellular network, although the activation server 190 may be under the control of other entities as well, such as for example, a third party as noted above. For example, this indication may include a message representative of a payment to activate the locked cellular modem 120A—providing thus a portion of the price (for example, an amount of money) of the locked cellular modem 120A that was, as noted, deferred until user activation.

At 215, the activation sever 190 may send, in response to the indication of 210, activation information to activate the locked cellular modem 120A, in accordance with some example embodiments. This activation information may, in some example embodiments, be sent to tablet 199 as, for example, an activation code, which when entered, or provided at, tablet 114 activates tablet 114. In some example embodiments, the activation information may be sent to another device (for example, as a short message service text, an email, and/or the like sent to a phone, a computer, and/or the like).

At 220, the locked cellular modem 120A may be activated, in accordance with some example embodiments. For example, a user may enter the activation information at a user interface at a processor, such as tablet 114 and the like, and this activation information may unlock the cellular modem 120A to enable access/registration/communication and/or the like with a wireless carrier's cellular network. The activation information may be received and may be programmatically extracted from a message sent or carried by a WiFi link from WiFi access point 110B. The locked cellular modem may be locked in a variety of ways and unlocked in a variety of ways as well. For example, a shared secret modem key may be stored in the user equipment during manufacture. The user equipment's operating system may block the use of the locked modem until the user equipment receives a matching shared secret modem key via a provisioning message from the network, a user, and/or an activation server, although other unlocking/activation approaches may be used as well.

At 225, after activation server 190 receives the payment indication at 210, the server 190 may forward a payment indication to enable debiting one or more accounts, in accordance with some example embodiments. For example, activation module 192 may send a message to a payment processor to debit an account, such as for example, a mobile wireless account, a credit card account, a prepaid credit card, and/or the like, associated with a user of tablet 114. The forwarding of the payment indication may also include crediting a third party entity associated with the locked cellular modem 120A to reimburse the third party entity for providing the locked cellular modem in exchange for a deferred payment after activation.

Although the previous example describes locking the cellular modem, other aspects of the user equipment may be locked until activated in accordance with process 200. For example, the user equipment may have a locked storage device, camera, and/or any other device that is locked until unlocked via process 200.

Figure 3:
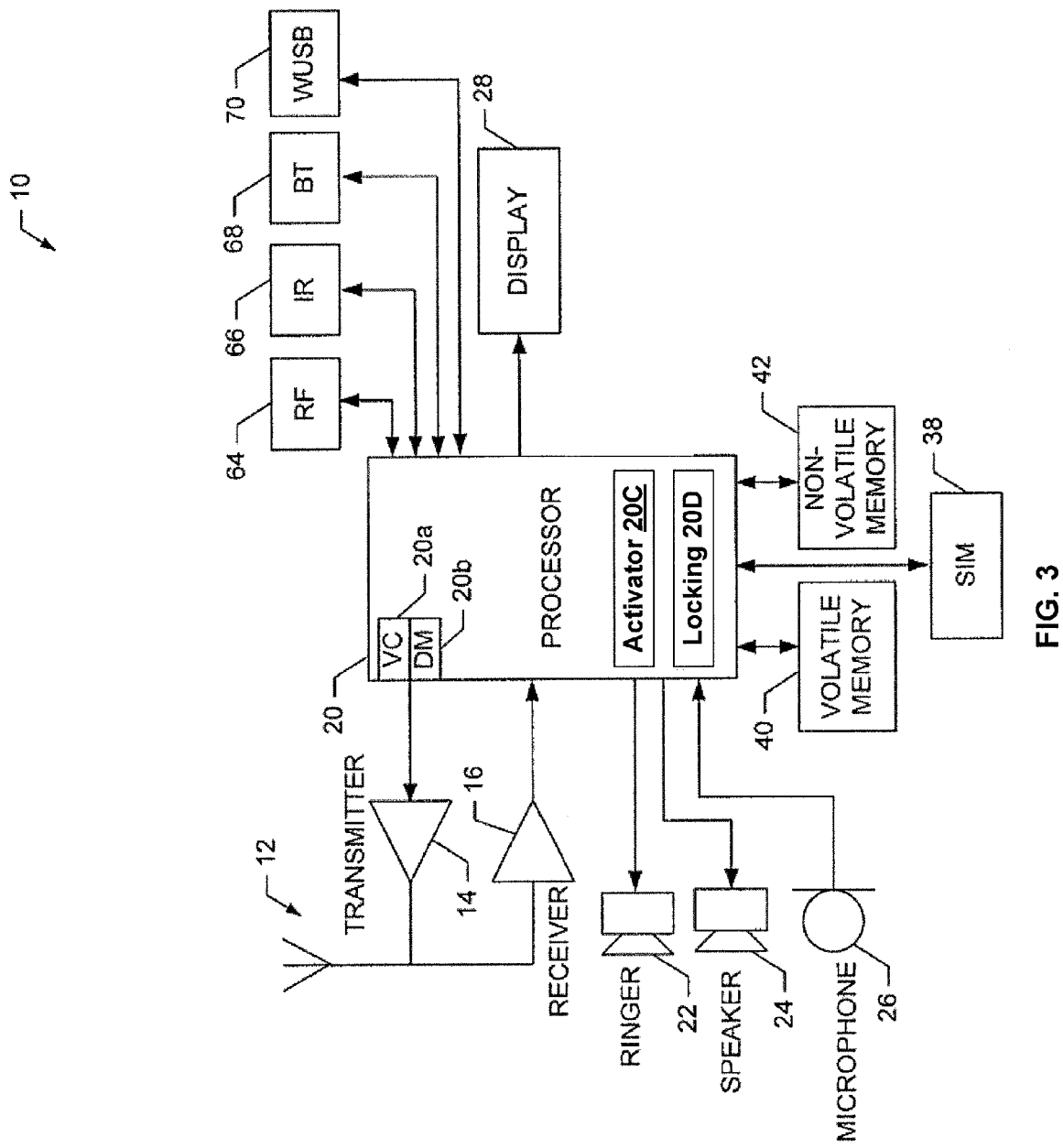
FIG. 3 depicts an example of an apparatus which may be used as the tablet being activated, in accordance with some example embodiments.

FIG. 3 illustrates a block diagram of an apparatus 10, which can be configured as tablet 114 in accordance with some example embodiments.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example, a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as for example, Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the apparatus 10 may be capable of operating in accordance with 2.5G wireless communication protocols General Packet Radio Service. (GPRS), Enhanced Data GSM Environment (EDGE), and/or the like. Further, for example, the apparatus 10 may be capable of operating in accordance with 3G wireless communication protocols, such as for example, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as for example, Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as for example, LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as for example, a web browser. The connectivity program may allow the apparatus 10 to transmit and receive web content, such as for example, location-based content, according to a protocol, such as for example, wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as for example, a keypad (which can be a virtual keyboard presented on display 28 or an externally coupled keyboard) and/or other input devices.

As shown in FIG. 3, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as for example, an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, radio standards. In this regard, the apparatus 10 and, in particular, the short-range transceiver may be capable of transmitting data to and/or receiving data from electronic devices within a proximity of the apparatus, such as for example, within 10 meters, for example. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as for example, IEEE 802.11 techniques, IEEE 802.15 techniques, IEEE 802.16 techniques, and/or the like.

The apparatus 10 may comprise memory, such as for example, a subscriber identity module (SIM) 38, a removable user identity module (R-UIM), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as for example, an international mobile equipment identification (IMEI) code, capable of uniquely identifying apparatus 10. The functions may include one or more of the operations disclosed herein with respect to the user equipment, such as for example, the functions disclosed at process 200 (for example, activate the cellular modem and/or the like). The memories may comprise an identifier, such as for example, an international mobile equipment identification (IMEI) code, capable of uniquely identifying apparatus 10. In the example embodiment, the processor 20 may be configured using computer code stored at memory 40 and/or 42 to provide an activation function 20C to generate requests for activation and perform other operations associated with activation of the locked cellular modem and a locking 20D function to lock and/or unlock the apparatus based on activation information.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any media that can contain, store, communicate, propagate or transport the instructions for use by or in connection with an instruction execution system, apparatus, or device, such as for example, a computer, with one example of a computer described and depicted in FIG. 3. A computer-readable medium may comprise a non-transitory computer-readable storage medium that may be any media that can contain or store the instructions for use by or in connection with an instruction execution system, apparatus, or device, such as for example, a computer. And, some of the embodiments disclosed herein include computer programs configured to cause methods as disclosed herein (see, for example, process 200 and/or the like).

Without in any way limiting the scope, interpretation, or application of the claims appearing below, a technical effect of one or more of the example embodiments disclosed herein is providing a cellular modem, which can be activated by a user after an initial purchase.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least."

What is claimed:
1. A method comprising:
providing, to a server, an indication representative of a request to unlock a locked cellular modem at a user equipment, wherein the user equipment comprises the locked cellular modem and a wireless local area network modem unlocked to allow operation via a wireless local area network, wherein the indication represents a payment corresponding to a purchase of the locked cellular modem, wherein the purchase of the locked cellular modem was not included in an initial purchase of the user equipment, and wherein the purchase of the locked cellular modem does not include a data plan purchase for use of the cellular modem;
receiving, at the user equipment, a provisioning message from the server, in response to the indication, wherein the provisioning message includes activation information to enable activating the locked cellular modem, and wherein the activation information includes a first shared secret key; and
activating, at the user equipment, the locked cellular modem when the received first shared secret key matches a second shared secret key stored at the user equipment before the initial purchase.

2. The method of claim 1, wherein the user equipment comprises a tablet.

3. The method of claim 1, wherein the wireless local area network modem comprises a WiFi modem.

4. The method of claim 1, wherein the locked cellular modem comprises a cellular modem configured to disable at least one of a registration to a cellular network, an authentication to a cellular network, or an access to a cellular network.

5. The method of claim 1, wherein the purchase of the cellular modem comprises a payment to at least one of a mobile wireless carrier, a service provider, a cellular modem manufacturer, a tablet maker, or a payment processor.

6. The method of claim 1, wherein the indication is wirelessly provided by the user equipment to the server, and wherein the activation information is wirelessly received by the user equipment from the server.

7. The method of claim 1, wherein the indication is provided by the user equipment to the server.

8. An apparatus, comprising:
at least one processor; and
at least one memory including computer program code, the at least one memory and the computer program code configured to, with the at least one processor, cause the apparatus to perform at least the following:
provide, to a server, an indication representative of a request to unlock a locked cellular modem at the apparatus, wherein the apparatus comprises the locked cellular modem and a wireless local area network modem unlocked to allow operation via a wireless local area network, wherein the indication represents a payment corresponding to a purchase of the locked cellular modem, wherein the purchase of the locked cellular modem was not included in an initial purchase of the apparatus, and wherein the purchase of the locked cellular modem does not include a data plan purchase for use of the cellular modem;
receive, at the apparatus, a provisioning message from the server, in response to the indication, wherein the provisioning message includes activation information to enable activating the locked cellular modem, and wherein the activation information includes a first shared secret key; and
activate, at the apparatus, the locked cellular modem when the received first shared secret key matches a second shared secret key stored at the apparatus before the initial purchase.

9. The apparatus of claim 8, wherein the apparatus comprises a tablet.

10. The apparatus of claim 8, wherein the wireless local area network modem comprises a WiFi modem.

11. The apparatus of claim 8, wherein the locked cellular modem comprises a cellular modem configured to disable at least one of a registration to a cellular network, an authentication to a cellular network, or an access to a cellular network.

12. The apparatus of claim 8, wherein the purchase of the cellular modem comprises a payment to at least one of a mobile wireless carrier, a service provider, a cellular modem manufacturer, a tablet maker, or a payment processor.

13. A non-transitory computer-readable medium encoded with instructions that, when executed by a computer, perform at least:
providing, to a server, an indication representative of a request to unlock a locked cellular modem at a user equipment, wherein the user equipment comprises the locked cellular modem and a wireless local area network modem unlocked to allow operation via a wireless local area network, wherein the indication represents a payment corresponding to a purchase of the locked cellular modem, wherein the purchase of the locked cellular modem was not included in an initial purchase of the user equipment, and wherein the purchase of the locked cellular modem does not include a data plan purchase for use of the cellular modem;
receiving, at the user equipment, a provisioning message from the server, in response to the indication, wherein the provisioning message includes activation information to enable activating the locked cellular modem, and wherein the activation information includes a first shared secret key; and
activating, at the user equipment, the locked cellular modem when the received first shared secret key matches a second shared secret key stored at the user equipment before the initial purchase.

* * * * *